United States Patent
Tyler et al.

(10) Patent No.: US 11,109,453 B2
(45) Date of Patent: Aug. 31, 2021

(54) SYSTEM FOR ADDITIVE MANUFACTURING USING THIN-FILM MATERIAL

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US); Trevor David Budge, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 306 days.

(21) Appl. No.: 15/897,904

(22) Filed: Feb. 15, 2018

(65) Prior Publication Data

US 2018/0230013 A1 Aug. 16, 2018

Related U.S. Application Data

(60) Provisional application No. 62/459,398, filed on Feb. 15, 2017.

(51) Int. Cl.

| | | |
|---|---|---|
| H05B 3/28 | (2006.01) |
| B33Y 70/00 | (2020.01) |
| B29C 64/165 | (2017.01) |
| B29C 70/88 | (2006.01) |
| B33Y 10/00 | (2015.01) |
| B33Y 30/00 | (2015.01) |
| B29C 64/232 | (2017.01) |
| B29C 64/245 | (2017.01) |
| B29C 64/209 | (2017.01) |
| B29C 64/236 | (2017.01) |

(Continued)

(52) U.S. Cl.
CPC ........... *H05B 3/286* (2013.01); *B29C 64/165* (2017.08); *B29C 64/209* (2017.08); *B29C 64/232* (2017.08); *B29C 64/236* (2017.08); *B29C 64/241* (2017.08); *B29C 64/245* (2017.08); *B29C 64/291* (2017.08); *B29C 64/393* (2017.08); *B29C 70/207* (2013.01); *B29C 70/384* (2013.01); *B29C 70/885* (2013.01); *B33Y 10/00* (2014.12); *B33Y 30/00* (2014.12); *B33Y 70/00* (2014.12); *C01B 32/194* (2017.08); *B29K 2101/10* (2013.01); *B29K 2995/0007* (2013.01); *B29L 2031/753* (2013.01); *B29L 2031/779* (2013.01); *B33Y 80/00* (2014.12); *H05B 2203/011* (2013.01); *H05B 2203/014* (2013.01)

(58) Field of Classification Search
CPC ..................................................... H05B 3/286
See application file for complete search history.

(56) References Cited

U.S. PATENT DOCUMENTS

2015/0059968 A1* 3/2015 Shinoda ................. A45D 33/38
156/240

OTHER PUBLICATIONS

Ryan Whitwam, Researchers Make Graphene Magnetic, Clearing the Way for Faster Everything, EXTREMETECH, Jan. 29, 2015.

* cited by examiner

*Primary Examiner* — Larry W Thrower
(74) *Attorney, Agent, or Firm* — Ryan C. Stockett

(57) ABSTRACT

A system is disclosed for additively manufacturing a structure. The system may include a feeder configured to feed a thin-film material through the system, and a cutter configured to cut out of the thin-film material a pattern associated with a shape of the structure at a particular layer within the structure. The system may also include a placer configured to place the pattern in at least one of a desired location and a desired orientation.

20 Claims, 1 Drawing Sheet

(51) Int. Cl.
  *B29C 64/241* (2017.01)
  *B29C 70/20* (2006.01)
  *B29C 70/38* (2006.01)
  *C01B 32/194* (2017.01)
  *B29C 64/291* (2017.01)
  *B29C 64/393* (2017.01)
  *B33Y 80/00* (2015.01)
  *B29L 31/00* (2006.01)
  *B29K 101/10* (2006.01)

SYSTEM FOR ADDITIVE MANUFACTURING USING THIN-FILM MATERIAL

RELATED APPLICATIONS

This application is based on and claims the benefit of priority from U.S. Provisional Application No. 62/459,398 that was filed on Feb. 15, 2017, the contents of which are expressly incorporated herein by reference.

TECHNICAL FIELD

The present disclosure relates generally to an additive manufacturing system and, more particularly, to a system for additive manufacturing using a thin-film material.

BACKGROUND

Graphene is an emerging construction material, which has many desirable characteristics. A simplified definition of graphene is a collection of carbon atoms arranged into a flat, two-dimensional lattice (e.g., a hexagonal lattice) that is a single-atom thick. Graphene is theorized to be the strongest and lightest material available for construction. In addition, graphene can be magnetic, and conducts both heat and electricity.

The construction industry hopes to harness the desirable characteristics of graphene, by way of additive manufacturing. For example, researchers are attempting to produce graphene filament that can be extruded through FDM-type printers, powders that can be sintered via SLS printers, and liquids that can be cured via SLA printers. Unfortunately, graphene can be a delicate material that is difficult to handle, and conventional additive manufacturing processes are prone to causing damage to the material during printing.

The disclosed additive manufacturing system is directed to overcoming one or more of the problems set forth above and/or other problems of the prior art.

SUMMARY

In one aspect, the present disclosure is directed to a system for additively manufacturing a structure. The system may include a feeder configured to feed a thin-film material through the system, and a cutter configured to cut out of the thin-film material a pattern associated with a shape of the structure at a particular layer within the structure. The system may also include a placer configured to place the pattern in at least one of a desired location and a desired orientation.

In another aspect, the present disclosure is directed to a thin-film material for use in an additive manufacturing system. The thin-film material may include a plurality of sequential frames joined end-to-end and spooled onto a reel. Each of the plurality of sequential frames includes a pattern cut into the thin-film material.

In yet another aspect, the present disclosure is directed to a method of additively manufacturing a structure. The method may include feeding a thin-film material to a staging location, and cutting out of the thin-film material a pattern associated with a shape of the structure at a particular layer within the structure. The method may also include placing the pattern in at least one of a desired location and a desired orientation on top of at least one of a print bed and an existing layer of the structure.

DETAILED DESCRIPTION

Figure 1:
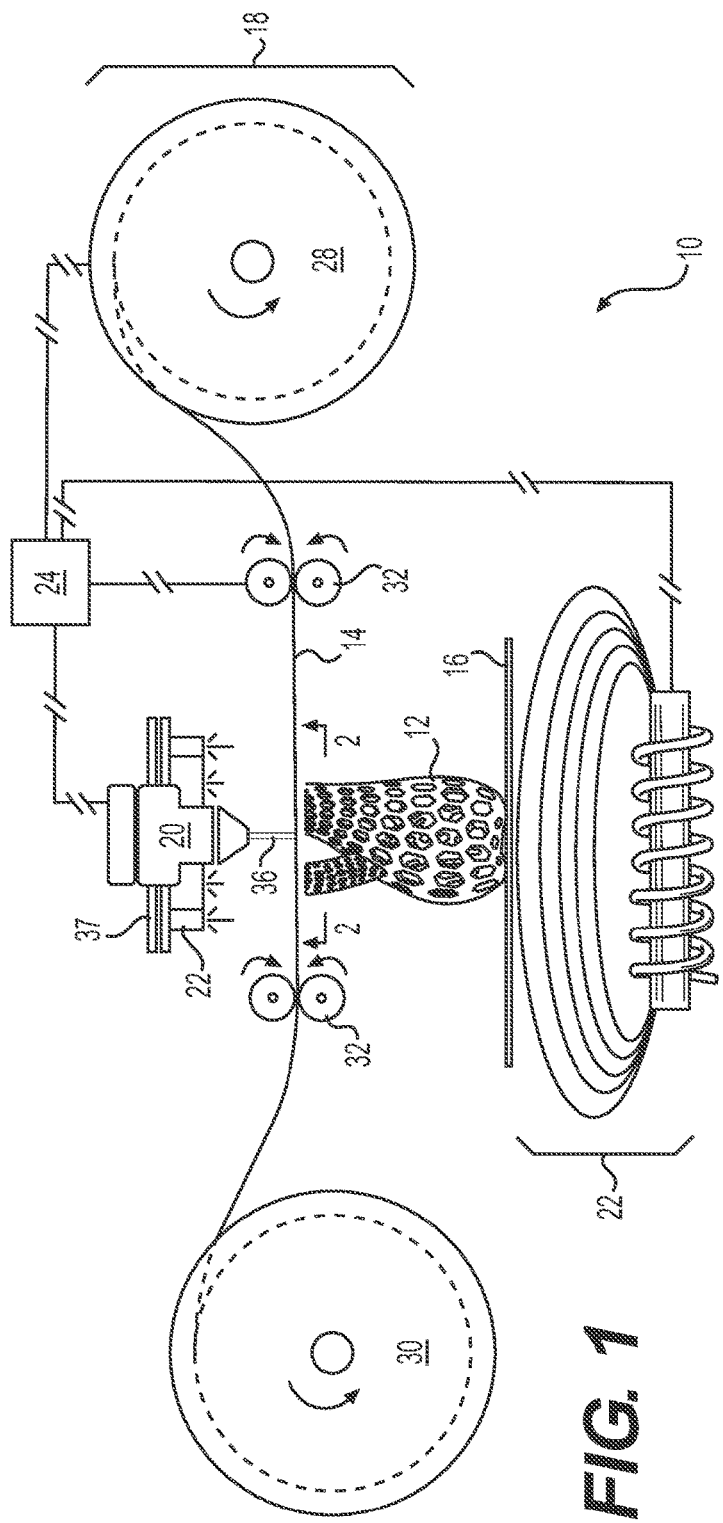
FIG. 1 is a diagrammatic illustration of an exemplary disclosed system for additively manufacturing a structure.

FIG. 1 illustrates an exemplary system 10, which can be used to quickly and efficiently fabricate a structure 12 from a thin-film material ("material") 14. In one embodiment, material 14 is a carbon-based material commonly known as graphene. It is contemplated that the graphene may be supplied and used in a magnetic or non-magnetic state. It is also contemplated that the graphene could be provided in a non-magnetic state, and subsequently magnetized in-situ, if desired. It should be noted, however, that other thin-film materials could alternatively be utilized as material 14 for system 10, if desired. For example, thermoplastic films could be used as material 14 for system 10.

Figure 2:
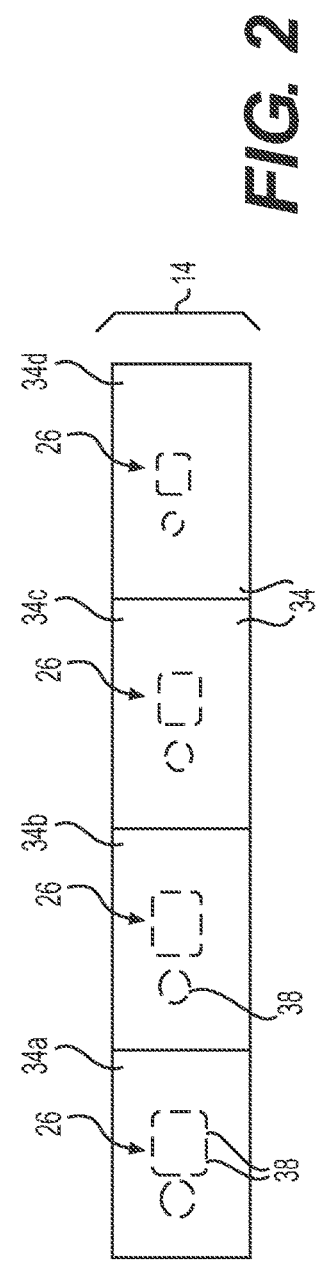
FIG. 2 is a diagrammatic illustration of exemplary disclosed material that may be passed through the system of FIG. 1.

System 10 may include, among other things, a print bed 16, a feeder 18, a cutter 20, at least one placer 22, and a controller 24 in communication with the other components of system 10. As explained in more detail below, feeder 18 may be configured to continuously or intermittently pass material 14 to a staging location adjacent (e.g., below) cutter 20 and adjacent (e.g., above) print bed 16. Cutter 20 may then be regulated by controller 24 to cut a desired pattern 26 (shown only in FIG. 2) within material 14 corresponding a desired shape and size of one layer of structure 12 at a particular height. After pattern 26 has been cut from material 14, placer 22 may be selectively energized by controller 24 to move (e.g., to push and/or pull) the cutout material down onto print bed 16 and/or onto a previously deposited layer of structure 12. Because of the electrical bond strength between adjacent carbon atoms in material 14, no other form of adhesive may be required to bind overlapping layers together. However, it is contemplated that an adhesive, heat, pressure, an electrical current, vibrations, and/or another mechanism could be used to enhance interlayer bonding, if desired.

Feeder 18 may include, among other things, a supply reel 28 configured to dispense new material 14, a take-up reel 30 configured to receive material 14 from which pattern 26 has been cut and removed, and any number of positioning rollers 32 configured to position material 14 relative to print bed 16 and/or cutter 20. In the disclosed embodiment, two sets of positioning rollers 32 are shown that cooperatively move individual frames 34 (e.g., sequential frames 34a, 34b, 34c, 34d that are joined end-to-end) of material 14 in only a longitudinal direction (i.e., in the direction extending between supply and take-up reels 30). It is contemplated, however, that transverse rollers (not shown) could additionally or alternatively be used to move frames 34 in a transverse direction that is substantially orthogonal to the longitudinal direction. During operation of system 10, material 14 may intermittently be passed from supply reel 28 through rollers 32 and spooled back up on take-up reel 30. Any one or more of supply reel 28, take-up reel 30, and rollers 32 may be powered to rotate (e.g., via an electric motor) when selectively energized by controller 24.

At some point in time during operation of system 10, as material 14 passes between the opposing sets of rollers 32, cutter 20 may be selectively activated by controller 24 to cut pattern 26 from material 14. In the disclosed embodiment, cutter 20 is a laser- or electron-type cutter configured to generate an energy beam 36 that passes down through the film of each frame 34 of material 14 in the shape of pattern 26. Beam 36 may vaporize, melt, oblate, tear, or otherwise pass through each film frame 34 at an outer edge of pattern 26, such that a portion of the film is free to fall away from the rest of frame 34. It is contemplated that other types of cutters (e.g., ultrasonic cutters, chemical cutters, mechanical cutters, etc.) could be used in place of the laser- or electron-type of cutter, if desired. In some instances, depending the configuration of cutter 20, a movable support 37 may be required to move cutter 20 in the shape of pattern 2. Controller 24 may communicate with and regulate operation of support 37, in these instances.

In the disclosed embodiment, cutter 20 is located directly over print bed 16, such that, after the cutting of film 34 has been completed, only z-direction movement of pattern 26 may be required. It is contemplated, however, that cutter 20 could be located elsewhere, if desired. For example, material 14 may be at least partially pre-cut by cutter 20 (or another cutter—not shown) at a remote location (e.g., at a material supply center—not shown) and held in place by one or more tethers 38 that are broken only during placement of pattern 26. It is also contemplated that most of pattern 26 may be pre-cut at the remote location, and minor portions (e.g., tethers 38) may be cut in-situ by cutter 20 just prior to placement. In addition, in some embodiments, the in-situ type of cutter 20 may not completely cut the outer perimeter of pattern 26, such that pattern 26 may still be held in place by one or more tethers 38 after cutter 20 has completed the cutting process.

After cutter 20 has completed the cutting process, placer 22 may be selectively activated by controller 24 to move the cutout pattern 26 down onto print bed 16 and/or onto structure 12 at a particular location and/or in a particular orientation. In one embodiment, placer 22 is an electromagnet (shown below print bed 16 in FIG. 1) that is selectively energized by controller 24 to generate a magnetic field passing through material 14. The magnetic field may be strong enough to break any remaining tethers 38 binding the cutout pattern 26 to the rest of frame 34 and to push and/or pull the cutout material into the desired location and orientation. In another embodiment, however, placer 22 may additionally or alternatively include one or more air jets (shown above material 14 and print bed 16), one or more vacuum jets (not shown), one or more ultrasonic devices (not shown), and/or other devices that generate airflows, sound waves and/or other force-transferring mediums that move the cut-out pattern 26 into place. Print bed 16 may be incrementally lowered after each placement event, such that the upper surface of structure 12 is located just below material 14.

In another embodiment (not shown), placer 22 could be imbedded within and integral to structure 12. For example, a base form of structure 12 could first be fabricated (e.g., via another additive manufacturing system) to include placer 22 of a particular shape and size at a particular internal location. Thereafter, a coating of graphene could be applied to the base form of structure 12 by selectively energizing the internal placer 22 using a process similar to that described above. This may allow the application of graphene at only specific locations and in very specific configurations (e.g., to create complex circuits of irregular shapes).

In a specific embodiment, an electrical current may be required to facilitate desired bonding between layers of structure 12. The electrical current may be passed by controller 24 through the layers of material 14 in any number of different ways. For example, it may be possible for placer 22 to push and/or pull pattern 26 down onto a previously deposited layer, while pattern 26 still remains connected to the rest of frame 34 by way of tethers 38. Thereafter, the current may be passed from supply reel 28 through material 14 to print bed 16, which may be grounded at this time. The current may be sufficient (e.g., about 20 amps of 120 v power) to overload tethers 38, which may function as fuses in this example, causing them to blow. The blowing of tethers 38 may rattle the carbon bonds between the two adjacent layers of graphene, causing the carbon atoms to reorient and crosslink between one another. This may enhance the interlayer bond of structure 12. It is also contemplated that a completely separate reel of material (e.g., a supply reel containing a mesh of graphene fibers) may be used for this purposed. For example, the mesh of graphene fibers may be placed between the adjacent layers of material 14 (pulled down with pattern 26) and pulsed with current, causing portions of the mesh to blow in the same manner described above with respect to tethers 38.

Controller 24 may be provided and communicatively coupled with reels 28 and 30, rollers 32, cutter 20, placer 22, and/or other components of system 10. Controller 24 may embody a single processor or multiple processors that include a means for controlling an operation of system 10. Controller 24 may include one or more general- or special-purpose processors or microprocessors. Controller 24 may further include or be associated with a memory for storing data such as, for example, design limits, performance characteristics, operational instructions, material characteristics, characteristics of structure 12, and corresponding parameters (e.g., operational characteristics, error logs, telemetry, etc.) of each component of system 10. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system 10 via wired and/or wireless transmission.

One or more maps may be stored in the memory of controller 24 and used during fabrication of structure 12. Each of these maps may include a collection of data in the form of lookup tables, graphs, and/or equations. In the disclosed embodiment, the maps are used by controller 24 to determine the desired shape of pattern 26 within each sequential frame 34 of material 14 (e.g., based on a specified shape of structure 12 at a corresponding layer); and corresponding operational characteristics of print bed 16, supply and/or take-up reels 28, 30, rollers 32, cutter 20, and/or placer(s) 22. Controller 24 may then correlate operations of the components of system 10, such that structure 12 is produced in a desired manner.

INDUSTRIAL APPLICABILITY

The disclosed system may allow for additive manufacturing of complex structures using thin-film materials, including graphene. This may facilitate fabrication lightweight, high-strength structures with desired magnetic and conductivity properties. The disclosed system may handle the thin-film materials in a manner that reduces damage of the materials prior to fabrication.

It will be apparent to those skilled in the art that various modifications and variations can be made to the disclosed additive manufacturing system. Other embodiments will be apparent to those skilled in the art from consideration of the specification and practice of the disclosed additive manufacturing system. For example, it is contemplated that various sensors, encoders, cameras, and such (not shown) may provide feedback to controller 24 for use in regulating the operations of the other components of system 10. It is intended that the specification and examples be considered as exemplary only, with a true scope being indicated by the following claims and their equivalents.

What is claimed is:

1. A system for additively manufacturing a structure, comprising:
   a feeder configured to feed a film material through the system;
   a cutter configured to cut out of the film material a pattern associated with a shape of the structure at a particular layer within the structure;
   a placer; and
   a controller in communication with the feeder, the cutter, and the placer, the controller being configured to regulate operation of the placer to place the pattern in at least one of a desired location and a desired orientation onto a previously deposited layer of the film material to build up the structure.

2. The system of claim 1, wherein the film material is graphene.

3. The system of claim 1, wherein the film material includes:
   a supply reel; and
   a take-up reel located at a side of the cutter opposite the supply reel.

4. The system of claim 3, further including a set of rollers located between the supply and take-up reels.

5. The system of claim 4, wherein at least one of the supply reel, the take-up reel, and the set of rollers is driven to rotate by a motor.

6. The system of claim 1, wherein the cutter is at least one of a laser-type and electron-type of cutter.

7. The system of claim 1, wherein the controller is further configured to control the cutter to cut less than a complete perimeter of the pattern, such that the pattern is held in place by at least one tether of the film material.

8. The system of claim 7, wherein the controller is further configured to selectively direct a current pulse through the at least one tether, causing carbon bonds in the pattern to realign with carbon bonds in a previously deposited pattern.

9. The system of claim 1, wherein:
   a majority of the pattern is cut prior to loading of the film material into the feeder; and
   the controller is configured to control the cutter to only cut a remaining portion of the pattern.

10. The system of claim 1, wherein:
    the placer is an electromagnet located at a side of the film material opposite the cutter; and
    the controller is further configured to selectively energize the electromagnet to generate an electric field passing through the film material.

11. The system of claim 1, wherein the placer includes at least one of an air jet, a vacuum jet, and an ultrasonic device.

12. The system of claim 1, further including:
    a print bed, wherein the
    controller is further configured to:
    selectively activate the feeder to move a specific frame of the film material to the cutter;
    selectively activate the cutter to cut a specific pattern from the specific frame of the film material; and
    selectively activate the placer to move the specific pattern cut from the specific frame of the film material to a specific location onto the previously deposited layer of the film material to build up the structure.

13. The system of claim 8, wherein the controller is configured to direct the current pulse through the feeder and the film material to a grounded print bed on which the structure is being fabricated.

14. A system for additively manufacturing a structure, comprising:
    a supply reel on which a thin-film material is wound;
    a cutter configured to cut out of the thin-film material a pattern associated with a shape of the structure at a particular layer within the structure;
    a take-up reel located at a side of the cutter opposite the supply reel;
    an electromagnet located at a side of the thin-film material opposite the cutter; and
    a controller configured to selectively energize the electromagnet to generate an electric field passing through the thin-film material that moves the pattern against at least one of a print bed and an adjacent layer of the thin-film material.

15. The system of claim 14, wherein the controller is further configured to selectively direct a current pulse through the pattern, causing carbon bonds in the pattern to realign with carbon bonds in the adjacent layer.

16. The system of claim 14, further including at least one of an air jet, a vacuum jet, and an ultrasonic device configured to bias the pattern against the adjacent layer.

17. The system of claim 14, further including at least one of a laser-type and an electron-type of cutter configured to at least partially cut the pattern into the thin-film material.

18. The system of claim 17, wherein
    the cutter is configured to cut less than a complete perimeter of the pattern, such that the pattern is held in place by at least one tether of the thin-film material; and
    the controller is further configured to selectively direct a current pulse through the pattern, causing the pattern to break free from a remainder of the thin-film material.

19. The system of claim 14, further including:
    a set of rollers located between the supply and take-up reels; and
    a motor configured to selectively drive the set of rollers to accurately place the pattern at a desired location relative to the adjacent layer.

20. The system of claim 14, wherein the thin-film material is graphene.

* * * * *